United States Patent Office 3,709,907
Patented Jan. 9, 1973

---

3,709,907
DITHIOAMIDES
Mohammad Behforouz, Charleston, W. Va., assignor to Monsanto Company, St. Louis, Mo.
No Drawing. Original application June 5, 1967, Ser. No. 643,401, now Patent No. 3,539,538, dated Nov. 10, 1970. Divided and this application Jan. 12, 1970, Ser. No. 7,436
Int. Cl. C07d 27/10, 27/52
U.S. Cl. 260—326 S
8 Claims

ABSTRACT OF THE DISCLOSURE

New compounds with a nucleus of

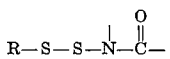

where the dangling valence on the nitrogen is linked to a second carbonyl, alkyl, aryl, cycloalkyl, hydrogen, alkylene carbon, or arylene carbon and R is alkyl, aryl, or cycloalkyl are inhibitors of premature vulcanization of diene rubbers. Compounds of the formula

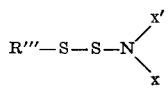

where $x$ is cycloalkyl, alkyl, aryl, or hydrogen and $x'$ is cycloalkyl, alkyl, or aryl; or $x$ and $x'$ together with the N atom form a heterocyclic amine; and $R'''$ is aryl, alkyl, or cycloalkyl are also inhibitors of premature vulcanization of diene rubbers. A combination of a vulcanization accelerator and an inhibitor of this invention is an improved rubber additive which allows longer and safer processing time for rubber.

---

This application is a division of application Ser. No. 643,401, filed June 5, 1967 and now U.S. Pat. No. 3,539,538.

BACKGROUND OF THE INVENTION

The invention pertains to the field of controlled rubber vulcanization art. The applicable U.S. patent classification defines the invention as "retarders."

In the manufacture of vulcanized rubber products, crude rubber is combined with various other ingredients such as fillers, accelerators, and antidegradants to alter and improve processing of the rubber and to improve the properties of the final product. The crude rubber is put through several steps in the plant before it is ready for the final step of vulcanization. Generally the rubber is mixed with carbon black and other ingredients except the vulcanizing agent and accelerator. Then the vulcanizing and accelerating agents are added to this masterbatch in a Banbury mixer or a mill. Scorching, viz., premature vulcanization, can occur at this stage of the processing, during the storage period before vulcanizing, and during the actual vulcanization. After the vulcanizing and accelerating agents are added, the mixture of crude rubber is ready for calendering or extruding and vulcanization. If premature vulcanization occurs during the storage of the crude mixture or during processing prior to vulcanization, the processing operations cannot be carried out because the scorched rubber is rough and lumpy, consequently, useless. Premature vulcanization is a major problem in the rubber industry and must be prevented in order to allow the rubber mix to be preformed and shaped before it is cured or vulcanized.

There are several reasons offered for premature vulcanization. The discovery of the thiazolesulfonamide accelerators constituted a major breakthrough in the vulcanization art because thiazolesulfenamides delayed onset of the vulcanizing process; but, once it started, the built-in amine activation of the thiazole resulted in strong, rapid curing. Mercaptobenzothiazole is a valuable organic vulcanization accelerator but by present standards would be considered scorchy. It has been largely replaced by the delayed-action accelerators. The development of high pH furnace blacks which lack the inherent inhibiting effect of the acidic channel blacks and the popularity of certain phenylenediamine antidegradants which promote scorching have placed increasingly stringent demands on the accelerator system.

Retarders have long been available to rubber compounders. These include N-nitrosodiphenylamine, salicyclic acid, and a terpent-resin acid blend. See editors of Rubber World, "Compounding Ingredients for Rubber," 125–128 (3rd. ed., 1965). Acids as retarders are generally ineffective with thiazolesulfenamide accelerators or adversely affect this vulcanizing process. Nitrosoamines as retarders are only of limited effectiveness with thiazolesulfonamides derived from primary amines. The co-pending application of Joseph E. Kerwood and Aubert Y. Coran, Ser. No. 579,493, filed Sept. 15, 1966, and assigned to Monsanto Company, discloses the use of a class of sulfenamides characterized by the presence of a carbonyl group adjacent to the sulfenamide nitrogen as premature vulcanization inhibitors. The co-pending application of Aubert Y. Coran, Joseph E. Kerwood, and Chester D. Trivette, Ser. No. 518,987, filed Jan. 6, 1966, and assigned to Monsanto Company, discloses the use of sulfenamides of the formula

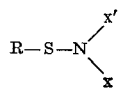

as premature vulcanization inhibitors. The two co-pending applications disclose compounds containing only one sulfur in a sulfenamide linkage as premature vulcanization inhibitors. This invention relates to dithio compounds as premature vulcanization inhibitors.

Himel's U.S. Pat. 2,520,401, cl. 260–293.4 (1950), assigned to Phillips Petroleum Company, discloses dithio compounds obtained from reacting a thiosulfenyl halide with an amine. The compounds disclosed by Himel are useful premature vulcanization inhibitors in this invention.

SUMMARY

I have discovered a class of dithio compounds which are inhibitors of premature vulcanization in rubber. The characteristic nucleus

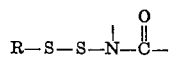

where the dangling valence on the nitrogen may be linked to a second carbonyl, alkyl, aryl, cycloalkyl, hydrogen, alkylene carbon, or arylene carbon and R is alkyl, aryl, or cycloalkyl. Also, compounds of the formula

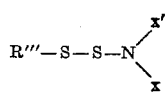

where $x$ is cycloalkyl, alkyl, aryl, or hydrogen and $x'$ is cycloalkyl, alkyl, or aryl, or $x$ and $x'$ with the nitrogen atom form a heterocyclic amine and $R'''$ is aryl, alkyl, or cycloalkyl are also inhibitors of premature vulcanization. Aryl is used in the usual generic sense to mean any univalent organic radical where free valence belongs to an aromatic carbocyclic nucleus and not to a side chain. The term includes radical substituted in the carbocyclic nucleus, for example, by alkyl, alkoxy, nitro, chloro, bromo, fluoro, iodo, and hydroxy. Alkyl is used in the usual generic sense to mean univalent aliphatic radicals of the series $C_nH_{2n+1}$ and includes radicals substituted in the carbon chain, as for example, by aryl, alkoxy, nitro, chloro, bromo, fluori, iodo, and hydroxy. Primary, secondary, and tertiary alkyls are included, for example, straight or branched chains. The term cycloalkyl includes cycloalkyl radicals of 5 to 8 carbon atoms in the ring. A combination of an accelerator and an inhibitor of this invention is an improved rubber additive which allows longer safer processing time for rubber.

DESCRIPTION OF THE PREFERRED EMBODIMENTS

My invention is that compounds having the formula

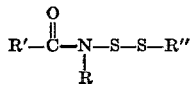

are premature vulcanization inhibitors for a vulcanizable diene rubber where R and R' with the carbonyl group and nitrogen atom constitute a radical, for example, N-phthalimidyl,
N-succinimidyl,
N-adipimidyl,
N-glutarimidyl,
N-malonimidyl,
N-hexahydrophthalimidyl,
7-oxabicyclo[2.2.1]heptane-2,3-dicarboximid-N-yl,
7-oxabicyclo[2.2.1]hept-5-ene-2,3-dicarboximid-N-yl,
tetrapropenylsuccinimid-N-yl,
methylsuccinimid-N-yl,
octadecylsuccinimid-N-yl
n-decenylsuccinimid-N-yl,
1,4,5,6,7,7-hexachlorobicyclo[2.2.1]hept-5-ene-2,3-dicarboximid-N-yl,
5,5-dimethyl-3-hydantoinyl,
5,5-diphenyl-3-hydantoinyl,
N-maleimidyl,
4-cyclohexene-1,2-dicarboximid-N-yl,
2-benzimidazolinon-1-yl,
2-benzothiazolinon-N-yl,
3-arylthio-2-benzimidazolinon-1-yl,
3-alkylthio-2-benzimidazolinon-1-yl,
3-cycloalkylthio-2-benzimidazolinon-1-yl,
3-aryldithio-2-benzimidazolinon-1-yl,
3-alkyldithio-2-benzimidazolinon-1-yl,
3-cycloalkyldithio-2-benzimidazolinon-1-yl,
2-imidazolinon-1-yl,
3-cycloalkylthio-2-imidazolinon-1-yl,
3-arylthio-2-imidazolinon-1-yl,
3-alkylthio-2-imidazolinon-1-yl,
2-imidazolindinon-1-yl,
3-cycloalkylthio-2-imidazolindon-1-yl,
3-arylthio-2-imidazolidinon-1-yl,
3-alkylthio-2-imidazolidinon-1-yl,
3-cycloalkyldithio-2-imidazolinon-1-yl,
3-aryldithio-2-imidazolinon-1-yl,
3-alkyldithio-2-imidazolinon-1-yl,
3-cycloalkyldithio-2-imidazolidinon-1-yl,
3-aryldithio-2-imidazolidinon-1-yl,
3-alkyldithio-2-imidazolidinon-1-yl,
bicyclo[2.2.1]hept-5-ene-2,3-dicarboximid-N-yl,
alkylbicyclo[2.2.1]hept-5-ene-2,3-dicarboximid-N-yl,
N-(arylthio)-1,2,4,5-benzenetetracarboxylic-1,2:4,5-diimid-N'-yl,
N-(cycloalkylthio)-1,2,4,5-benzenetetracarboxylic-1,2:4,5-diimid-N'-yl,
N-(alkylthio)-1,2,4,5-benzenetetracarboxylic-1,2:4,5-diimid-N'-yl,
N-(aryldithio)-1,2,4,5-benzenetetracarboxylic-1,2:4,5-diimid-N'-yl,
N-(cycloalkyldithio)-1,2,4,5-benzenetetracarboxylic-1,2:4,5-diimid-N'-yl,
N-(alkyldithio)-1,2,4,5-benzenetetracarboxylic-1,2:4,5-diimid-N'-yl,
N-naphthalimidyl, or N-(3,4,5,6-tetrahalophthalimidyl), and R'' is alkyl, aryl, or cycloalkyl. More specific examples of R'' are $CCl_3$, methyl, ethyl, propyl, isopropyl, butyl, amyl, t-butyl, cyclohexyl, phenyl, benzyl, chlorophenyl, nitrophenyl, tolyl, and naphthyl.

The premature vulcanization inhibitors of this invention include compounds of the formula

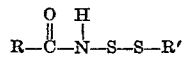

where

constitutes a radical, for example,

N-(arylthio)carbamoyl,
N-(cycloalkylthio)carbamoyl,
N-(alkylthio)carbamoyl,
N-arylcarbamoyl,
N-alkylcarbamoyl,
N-cycloalkylcarbamoyl,
N-(aryldithio)carbamoyl,
N-(cycloalkyldithio)carbamoyl, and
N-(alkyldithio)carbamoyl, and
R' is alkyl, aryl, or cycloalkyl. More specific examples of

are N-(phenylthio)carbamoyl,
N-(chlorophenylthio)carbamoyl,
N-(benzylthio)carbamoyl,
N-(tolylthio)carbamoyl,
N-(methylthio)carbamoyl,
N-(ethylthio)carbamoyl,
N-(propylthio)carbamoyl,
N-(isopropylthio)carbamoyl,
N-(t-butylthio)carbamoyl,
N-phenylcarbamoyl,
N-methylcarbamoyl,
N-ethylcarbamoyl,
N-propylcarbamoyl,
N-isopropylcarbamoyl,
N-t-butyl carbamoyl,
N-trichloromethylcarbamoyl,
N-benzylcarbamoyl,
N-nitrophenylcarbamoyl,
N-chlorophenylcarbamoyl,
tolylcarbamoyl,
N-phenyldithio)carbamoyl,
N-(chlorophenyldithio)carbamoyl,
N-(benzyldithio)carbamoyl,
N-(tolyldithio)carbamoyl),
N-methyldithio)carbamoyl,
N-(ethyldithio)carbamoyl,
N-(propyldithio)carbamoyl,
N-(isopropyldithio)carbamoyl,
N-(t-butyldithio)carbamoyl, and more specific examples of R' are methyl, ethyl, propyl, isopropyl, t-butyl, trichloromethyl, phenyl, benzyl, chlorophenyl, tolyl, nitrophenyl, naphthyl, sec-butyl, n-butyl, n-amyl, n-hexyl, cyclohexyl, n-heptyl, 2-ethylhexyl, n-octyl, n-decyl, n-undecyl, n-dodecyl, n-tridecyl, o-tolyl, p-tolyl, m-tolyl, p-ethylphenyl, and p-isopropylphenyl.

The premature vulcanization inhibitors of this invention include compounds of the formula

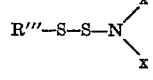

where $x$ and $x'$ are identical or dissimilar cycloalkyl, alkyl, or aryl radicals, or one may be hydrogen. When x and x' are taken together with the nitrogen atom, they form

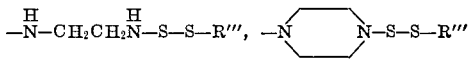

morpholine, or mono-, di-, tri-, or tetra-(lower alkyl)morpholine. R''' is a straight- or branced-chain alkyl, a cycloalkyl, or an aryl radical.

Examples of the new compounds of the invention are

N-(cyclohexyldithio)phthalimide,
N-(cyclooctyldithio)phthalimide,
N-(-benzyldithio)phthalimide,
N-(methyldithio)phthalimide,
N-(ethyldithio)phthalimide,
N-(n-butyldithio)phthalimide,
N-(t-butyldithio)phthalimide,
N-(isobutyldithio)phthalimide,
N-(sec-butyldithio)phthalimide,
N-(n-pentyldithio)phthalimide,
N-(n-heptyldithio)phthalimide,
N-(n-hexyldithio)phthalimide,
N-(n-octyldithio)phthalimide,
N-(n-dodecyldithio)phthalimide,
N-[(alpha-chlorocyclohexyl)dithio]phthalimide,
N-(phenyldithio)phthalimide,
N-(p-chlorophenyldithio)phthalimide,
N-(o-tolyldithio)phthalimide,
N-(m-tolyldithio)phthalimide,
N-(o-nitrophenyldithio)phthalimide,
N-[(trichloromethyl)dithio]phthalimide,
N-(naphthyldithio)phthalimide,
N-(cyclohexyldithio)adipimide,
N-(cyclooctyldithio)adipimide,
N-(benzyldithio)adipimide,
N-(methyldithio)adipimide,
N-(ethyldithio)adipimide,
N-(propyldithio)adipimide,
N-(isopropyldithio)adipimide,
N-(n-butyldithio)adipimide,
N-(t-butyldithio)adipimide,
N-(isobutyldithio)adipimide,
N-(sec-butyldithio)adipimide,
N-(n-pentyldithio)adipimide,
N-(n-heptyldithio)adipimide,
N-(n-hexyldithio)adipimide,
N-(n-octyldithio)adipimide,
N-(n-dodecyldithio)adipimide,
N-(phenyldithio)adipimide,
N-(tolyllithio)adipimide,
N-(cyclohexyldithio)glutarimide,
N-(cyclooctyldithio)glutarimide,
N-(benzyldithio)glutarimide,
N-(methyldithio)glutarimide,
N-(ethyldithio)glutarimide,
N-(propyldithio)glutarimide,
N-(isopropyldithio)glutarimide,
N-(n-butyldithio)glutarimide,
N-(t-butyldithio)glutarimide,
N-(isobutyldithio)glutarimide,
N-(sec-butyldithio)glutarimide,
N-(n-pentyldithio)glutarimide,
N-(n-heptyldithio)glutarimide,
N-(n-hexyldithio)glutarimide,
N-(n-octyldithio)glutarimide,
N-(n-dodecyldithio)glutarimide,
N-(phenyldithio)glutarimide,
N-(tolyldithio)glutarimide,
N-(cyclohexyldithio)malonimide,
N-(cyclooctyldithio)malonimide,
N-(benzyldithio)malonimide,
N-(methyldithio)malonimide,
N-(ethyldithio)malonimide,
N-(propyldithio)malonimide,
N-(isopropyldithio)malonimide,
N-(n-butyldithio)malonimide,
N-(t-butyldithio)malonimide,
N-(isobutyldithio)malonimide,
N-(sec-butyldithio)malonimide,
N-(n-pentyldithio)malonimide,
N-(n-heptyldithio)malonimide,
N-(n-hexyldithio)malonimide,
N-(n-octyldithio)malonimide,
N-(n-dodecyldithio)malonimide,
N-(phenyldithio)malonimide,
N-(tolyldithio)malonimide,
N-(cyclohexyldithio)-7-oxabicyclo[2.2.1]heptane-2,3-dicarboximide,
N-(cyclohexyldithio)-7-oxabicyclo-[2.2.1]hept-5-ene-2,3-dicarboximide,
N-(cyclohexyldithio)-hexahydrophthalimide,
1,3-bis(cyclohexyldithio)-2-imidazolinone,
1,3-bis(cyclooctyldithio)-2-imidazolinone,
1,3-bis(phenyldithio)-2-imidazolinone,
1,3-bis(chlorophenyldithio)-2-imidazolinone,
1,3-bis(benzyldithio)-2-imidazolinone,
1,3-bis(tolyldithio)-2-imidazolinone,
1,3-bis(nitrophenyldithio)-2-imidazolinone,
1,3-bis(t-butyldithio)-2-imidazolinone,
1,3-bis(methyldithio)-2-imidazolinone,
1,3-bis(ethyldithio)-2-imidazolinone,
1,3-bis(propyldithio)-2-imidazolinone,
1,3-bis(isopropyldithio)-2-imidazolione,
1,3-bis(isopropyldithio)-2-imidazolinone,
1-(n-dodecyldithio)-2-imidazolinone,
1-cyclohexylthio-3-cyclohexyldithio-2-imidazolinone,
1-cyclooctylthi-3-cyclooctyldithi-2-imidazolinone,
1-cyclooctylthio-3-cyclooctyldithio-2-imidazolinone,
1-chlorophenylthio-3-chlorophenyldithio-2-imidazolinone,
1-benzylthio-3-benzyldithio-2-imidazolinone,
1-tolylthio-3-tolyldithio-2-imidazolinone,
1-nitrophenylthio-3-nitrophenyldithio-2-imidazolinone,
1-t-butylthio-3-butyldithio-2-imidazolinone,
1-methylthio-3-methyldithio-2-imidazolinone,
1-ethylthio-3-ethyldithio-2-imidazolinone,
1-propylthio-3-propyldithio-2-imidazolinone,
1-isopropylthio-3-isopropyldithio-2-imidazolinone,
1-n-dodecylthio-3-n-dodecyldithio-2-imidazolinone,
N,N'-di(phenyldithio)urea,
N,N'-di(cyclohexyldithio)urea,
N,N'-di(cyclooctyldithio)urea,
N,N'-di(nitrophenyldithio)urea,
N,N'-di(chlorophenyldithio)urea,
N,N'-di(benzyldithio)urea,
N,N'-di(tolyldithio)urea,
N,N'-di(t-butyldithio)urea,
N,N'-di(methyldithio)urea,
N,N'-di(ethyldithio)urea,
N,N'-di(propyldithio)urea,
N,N'-di(isopropyldithio)urea,
N,N'-di(n-dodecyldithio)urea,
N-(phenylthio)-N'-(phenyldithio)urea,
N-(cyclohexylthio)-N'-(cyclohexyldithio)urea,
N-(cyclooctylthio)-N'-(cyclooctyldithio)urea,
N-(chlorophenylthio)-N'-(chlorophenyldithio)urea,
N-(benzylthio)-N'-(benzyldithio)urea,
N-(tolylthio)-N'-(tolydithio)urea,
N-(butylthio)-N'-(butyldithio)urea,
N-(methylthio)-N'-(methyldithio)urea,
N-(ethylthio)-N'-(ethyldithio)urea,
N-(propylthio)-N'-(propyldithio)urea,
N-(isopropylthio)-N'-(isopropyldithio)urea,
N-(dodecylthio)-N'-(dodecyldithio)urea,
1,3-bis(n-hexyldithio)-1,3-dicyclohexylurea,
N-phenyl-N'-(phenyldithio)urea,
N-phenyl-N'-(methyldithio)urea,
N-phenyl-N'-(ethyldithio)urea,
N-(phenyl-N'-(propyldithio)urea, N-phenyl-N'-(isopropyldithio)urea,
N-phenyl-N'-(t-butyldithio)urea,
N-phenyl-N'-(n-dodecyldithio)urea,
N-phenyl-N'-(cyclohexyldithio)urea,
N-phenyl-N'-(cyclooctyldithio)urea,
N-methyl-N'-(phenyldithio)urea,
N-ethyl-N'-(phenyldithio)urea,
N-propyl-N'-(phenyldithio)urea,
N-isopropyl-N'-(phenyldithio)urea,
N-t-butyl-N'-(phenyldithio)urea,
N-cyclooctyl-N'-(phenyldithio)urea,
N-cyclohexyl-N'-(phenyldithio)urea,
N-n-dodecyl-N'-(phenyldithio)urea,
N-[(trichloromethyl)dithio]maleimide,
N-(cyclohexyldithio)maleimide,
N-(cyclooctyldithio)malemide,
N-(phenyldithio)maleimide,
N-(chlorophenyldithio)maleimide,
N-(tolyldithio)maleimide,
N-(nitrophenyldithio)maleimide,
N-(benzyldithio)maleimide,
N-(t-butyldithio)maleimide,
N-(methyldithio)maleimide,
N-(ethyldithio)maleimide,
N-(propyldithio)maleimide,
N-(isopropyldithio)maleimide,
N-(n-dodecyldithio)maleimide,
5,5-dimethyl-3-[(trichloromethyl)dithio]hydantoin,
5,5-diphenyl-3-[(trichloromethyl)dithio]hydantoin,
5,5-dimethyl-3-(cyclohexyldithio)hydantoin,
5,5-dimethyl-3-(cyclooctyldithio)hydantoin,
5,5-dimethyl-3-(phenyldithio)hydantoin,
5,5-dimethyl-3-(chlorophenyldithio)hydantoin,
5,5-dimethyl-3-(benzyldithio)hydantoin,
5,5-dimethyl-3-(tolyldithio)hydantoin,
5,5-dimethyl-3-(nitrophenyldithio)hydantoin,
5,5-dimethyl-3-(t-butyldithio)hydantoin,
5,5-dimethyl-3-(methyldithio)hydantoin,
5,5-dimethyl-3-(ethyldithio)hydantoin,
5,5-dimethyl-3-(propyldithio)hydantoin,
5,5-dimethyl-3-(isopropyldithio)hydantoin,
5,5-dimethyl-3-(n-dodecyldithio)hydantoin,
1,4,5,6,7,7-hexachloro-N-(trichloromethyldithio)
  bicyclo[2.2.1]hept-5-ene-2,3-dicarboximide,
1,4,5,6,7,7-hexachloro-N-(cyclohexyldithio)bicyclo
  [2.2.1]hept-5-ene-2,3-dicarboximide,
1,4,5,6,7,7-hexachloro-N-(cyclooctyldithio)bicyclo[2.2.1]
  hept-5-ene-dicarboximide,
1,4,5,6,7,7-hexachloro-N-(phenyldithio)bicyclo[2.2.1]
  hept-5-ene-2,3-dicarboximide,
1,4,5,6,7,7-hexachloro-N-(chlorophenyldithio)bicyclo
  [2.2.1]hept-5-ene-2,3-dicarboximide,
1,4,5,6,7,7-hexachloro-N-(benzyldithio)bicyclo[2.2.1]
  hept-5-ene-2,3-dicarboximide,
1,4,5,6,7,7-hexachloro-N-(tolyldithio)bicyclo[2.2.1]
  hept-5-ene-2,3-dicarboximide,
1,4,5,6,7,7-hexachloro-N-(nitrophenyldithio)bicyclo
  [2.2.1]hept-5-ene-2,3-dicarboximide,
1,4,5,6,7,7-hexachloro-N-(t-butyldithio)bicyclo[2.2.1]
  hept-5-ene-2,3-dicarboximide,
1,4,5,6,7,7-hexachloro-N-(methyldithio)bicyclo[2.2.1]
  hept-5-ene-2,3-dicarboximide,
1,4,5,6,7,7-hexachloro-N-(ethyldithio)bicyclo[2.2.1]
  hept-5-ene-2,3-dicarboximide,
N(propyldithio)bicyclo[2.2.1]hept-5-ene-2,3-
  dicarboximide,
1,4,5,6,7,7-hexachloro-N-(isopropyldithio)bicyclo[2.2.1]
  hept-5-ene-2,3-dicarboximide,
1,4,6,7,7-hexachloro-N-(n-dodecylthio)bicyclo
  [2.2.1]hept-5-ene-2,3-dicarboximide,
N-[(trichloromethyl)dithio]-1,2,3,6-tetrahydro-
  phthalimide,
N-(cyclohexyldithio)-1,2,3,6-tetrahydrophthalimide,
N-(cyclooctyldithio)-1,2,3,6-tetrahydrophthalimide,
N-(phenyldithio)-1,2,3,6-tetrahydrophthalimide,
N-(chlorophenyldithio)-1,2,3,6-tetrahydrophthalimide,
N-(benzyldithio)-1,2,3,6-tetrahydrophthalimide,
N-(tolyldithio)-1,2,3,6-tetrahydrophthalimide,
N-(nitrophenyldithio)-1,2,3,6-tetrahydrophthalimide,
N-(t-butyldithio)-1,2,3,6-tetrahydrophthalimide,
N-(methyldithio)-1,2,3,6-tetrahydrophthalimide,
N-(ethyldithio)-1,2,3,6-tetrahydrophthalimide,
N-(propyldithio)-1,2,3,6-tetrahydrophthalimide,
N-(n-dodecyldithio)-1,2,3,6-tetrahydrophthalimide,
N-(isopropyldithio)-1,2,3,6-tetrahydrophthalimide,
1,3-bis(trichloromethyldithio)-2-benzimidazolinone,
1-trichloromethyldithio-2-benzimidazolinone,
1,3-bis(trichloromethyldithio)-5,6-dichloro-2-benzimid-
  azolinone,
1,3-bis(trichloromethyldithio)-5-chloro-2-
  benzimidazolinone,
1-cyclohexylthio-3-cyclohexyldithio-2-benzimidazolinone,
1-cyclooctylthio-3-cyclooctyldithio-2-benzimidazolinone,
1-phenylthio-3-phenyldithio-2-benzimidazolinone,
1-tolylthio-3-tolyldithio-2-benzimidazolinone and
  mixtures thereof,
1-m-tolylthio-3-m-tolyldithio-2-benzimidazolinone,
1-chlorophenylthio-3-chlorophenyldithio-2-benzimid-
  azolinone,
1-benzylthio-2-benzyldithio-2-benzimidazolinone,
1-nitrophenylthio-3-nitrophenyldithio-2-
  benzimidazolinone,
1-t-butylthio-3-t-butyldithio-2-benzimidazolinone,
1-propylthio-3-propyldithio-2-benzimidazolinone,
1-methylthio-3-methyldithio-2-benzimidazolinone,
1-ethylthio-3-ethyldithio-2-benzimidazolinone,
1-isopropylthio-3-isopropyldithio-2-bezimidazolinone,
1-n-dodecylthio-3-n-dodecyldithio-2-benzimidazolinone,
1,3-bis(cyclohexyldithio)-2-benzimidazolinone,
1,3-bis(cyclooctyldithio)-2-benzimidazolinone,
1,3-bis(chlorophenylthio)-2-benzimidazolinone,
1,3-bis(tolyldithio)-2-benzimidazolinone and
  mixtures thereof,
1,3-bis(m-tolyldithio)-2-benzimidazolinone,
1-phenyldithio-2-benzimidazolinone,
1-benzyldithio-2-benzimidazolinone,
1-chlorophenyldithio-2-benzimidazolinone,
1-nitrophenyldithio-2-benzimidazolinone,
1-cyclohexyldithio-2-benzimidazolinone,
1-cyclooctyldithio-2-benzimidazolinone,
1-tolyldithio-2-benzimidazolinone,
1-t-butyldithio-2-benzimidazolinone,
1-methyldithio-2-benzimidazolinone,
1-ethyldithio-2-benzimidazolinone,
1-propyldithio-2-benzimidazolinone,
1-isopropyldithio-2-benzimidazolinone,
1-chloropropyldithio-2-benzimidazolinone,
1,3-bis(chlorophenyldithio)-2-benzimidazolinone,
1,3-bis(benzyldithio)-2-benzimidazolinone,
1,3-bis(nitrophenyldithio)-2-benzimidazolinone,
1,3-bis(t-butyldithio)-2-benzimidazolinone,
1,3-bis(propyldithio)-2-benzimidazolinone,
1,3-bis(methyldithio)-2-benzimidazolinone,
1,3-bis(ethyldithio)-2-benzimidazolinone,
1,3-bis(isopropyldithio)-2-benzimidazolinone,
1,3-bis(n-dodecyldithio)-2-benzimidazolinone,
N-phenyldithio-3,4,5,6-tetrachlorophthalimide,
N-tolyldithio-3,4,5,6-tetrachlorophthalimide,
N-chlorophenyldithio-3,4,5,6-tetrachlorophthalimide,
N-benzyldithio-3,4,5,6-tetrachlorophthalimide,
N-nitrophenyldithio-3,4,5,6-tetrachlorophthalimide,
N-n-butyldithio-3,4,5,6-tetrachlorophthalimide,
N-n-dodecyldithio-3,4,5,6-tetrachlorophthalimide,
N-cyclohexyldithio-3,4,5,6-tetrachlorophthalimide,
N-cyclooctyldithio-3,4,5,6-tetrachlorophthalimide,
N-phenyldithio-3,4,5,6-tetrabromophthalimide,
N-(ar-tolyldithio)-3,4,5,6-tetrachlorophthalimide,
N-(ar-tolyldithio)-3,4,5,6-tetrabromophthalimide,
N-(phenyldithio)-napthalimide, N-(chlorophenyldithio)naphthalimide,
N-(benzyldithio)naphthalimide,
N-(nitrophenyldithio)naphthalimide,
N-(n-butyldithio)naphthalimide,
N-(n-dodecyldithio)naphthalimide,
N-(cyclohexyldithio)naphthalimide,
N-(cyclooctyldithio)naphthalimide,
N,N'-bis(ar-tolyldithio)-1,2,4,5-benzenetetracarboxylic-1,2:4,5-diimide,
1,3-bis(cyclohexyldithio)-2-imidazolidinone,
1,3-bis(cyclooctyldithio)-2-imidazolinone,
1,3-bis(phenyldithio)-2-imidazolidinone,
1,3-bis(chlorophenyldithio)-2-imidazolidinone,
1,3-bis(benzyldithio)-2-imidazolidinone,
1,3-bis(tolyldithio)-2-imidazolidinone,
1,3-bis(nitrophenyldithio)-2-imidazolidinone,
1,3-bis(t-butyldithio)-2-imidazolidinone,
1,3-bis(methyldithio)-2-imidazolidinone,
1,3-bis(ethyldithio)-2-imidazolidinone,
1,3-bis(propyldithio)-2-imidazolidinone,
1,3-bis(isopropyldithio)-2-imidazolidinone,
1,3-bis(n-dodecyldithio)-2-imidazolidinone,
1-(n-dodecyldithio)-2-imidazolidinone,
1-cyclohexylthio-3-cyclohexyldithio-2-imidazolidinone,
1-cyclooctylthio-3-cyclooctyldithio-2-imidazolidinone,
1-phenylthio-3-phenyldithio-2-imidazolidinone,
1-chlorophenylthio-3-chlorophenyldithio-2-imidazolidinone,
1-benzylthio-3-benzyldithio-2-imidazolidinone,
1-tolylthio-3-tolyldithio-2-imidazolidinone,
1-nitrophenylthio-3-nitrophenyldithio-2-imidazolidinone,
1-t-butylthio-3-t-butyldithio-2-imidazolidinone,
1-methylthio-3-methyldithio-2-imidazolidinone,
1-ethylthio-3-ethyldithio-2-imidazolidinone,
1-propylthio-3-propyldithio-2-imidazolidinone,
1-n-dodecylthio-3-n-dodecyldithio-2-imidazolidinone,
N-[(trichloromethyl)dithio]succinimide,
N-(n-butyldithio)succinimide,
N-(methyldithio)succinimide,
N-(ethyldithio)succinimide,
N-(propyldithio)succinimide,
N-(isopropyldithio)succinimide,
N-(cyclohexyldithio)succinimide,
N-(cyclohexyldithio)succinimide,
N-(cyclooctyldithio)succinimide,
N-(p-chlorophenyldithio)succinimide,
N-(o-tolyldithio)succinimide,
N-(m-tolyldithio)succinimide,
N-(p-tolyldithio)succinimide,
N-(t-butyldithio)succinimide,
N-(phenyldithio)succinimide,
N-(nitrophenyldithio)succinimide,
N-(n-dodecyldithio)succinimide, and
N-(benzyldithio)succinimide.

Other compounds which are useful in the practice of this invention are

N-(phenyldithio)morpholine,
N-(phenyldithio)-2,6-dimethylmorpholine,
N-(phenyldithio)dicyclohexylamine,
N-(phenyldithio)aniline,
N-(phenyldithio)diisopropylamine,
N-(phenyldithio)diethylamine,
N-(phenyldithio)t-butylamine,
N,N'-bis(phenyldithio)ethylenediamine,
N-(phenyldithio)-N-phenyl-ethylamine,
N-(phenyldithio)cyclohexylamine,
N-phenyldithio-N-t-butyl-ethylamine,
N-phenyldithio-N-cyclohexylmethylamine,
N-phenyldithio-N-phenylethylamine,
N-phenyldithio-N-phenyl-cyclohexylamine,
N-tolyldithio-N-cyclohexyl-methylamine,
N-(n-butyldithio)morpholine,
N-(benzyldithio)morpholine,
1,4-bis(n-butyldithio)piperazine,
N-(dodecyldithio)morpholine,
1,4-bis(benzyldithio)piperazine,
N-(t-butyldithio)morpholine,
N-(n-butyldithio)-N-ethyl-n-butylamine,
N-(n-butyldithio)-N-methylaniline,
N-(n-octyldithio)morpholine,
1,4-bis(decyldithio)piperazine,
N-(n-tetradecyldithio)moropholine,
1,4-bis(n-hexadecyldithio)piperazine,
N-(n-octadecyldithio)moropholine,
N-(sec-tridecyldithio)morpholine,
N-(sec-octyldithio)morpohline,
1,4-bis(t-pentadecydithio)piperazine,
N-(isobutyldithio)morpholine,
N-(phenyldithio)piperidine,
N-(cyclohexyldithio)piperidine, and
N-(isobutyldithio)piperidine.

Rubber stocks containing delayed-action accelerators can be used in the process of this invention. Cheaper, more scorchy accelerators can also be used. The improved vulcanizing process of this invention can be used advantageously to process stocks containing furnace blacks as well as stocks containing other types of blacks and fillers used in rubber compounding. The invention is also applicable to gum stocks.

My invention is applicable to rubber mixes containing sulfur-vulcanizing agents, peroxide-vulcanizing agents, organic accelerators for vulcanization, and antidegradants. For the purposes of this invention, sulfur-vulcanizing agent means elements sulfur or sulfur-containing vulcanizing agent. The invention is applicable to rubber mixes containing vulcanization accelerators of various classes. For example, rubber mixes containing the aromatic thiazole accelerators which include benzothiazyl-2-monocyclohexyl sulfenamide, 2-mercaptobenzothiazole, N-t-butyl-2-benzothiazole sulfenamide, 2-benzothiazolyl diethyldithiocarbamate, and 2 - (morpholinothio)benzothiazole can be used. Amine salts of mercaptobenzothiazole accelerators, for example, the t-butylamine salt of mercaptobenzothiazole, like salts of morpholine and 2,6-dimethylmorpholine, can be used in the invention. Thiazole accelerators other than aromatic can be used. Stocks containing accelerators, for example, the tetramethylthiuram disulfide, tetramethylthiuram monosulfide, aldehydeamine condensation products, thiocarbamylsulfenamides, thioureas, xanthates, and guanidine derivatives, are substantially improved using the process of this invention. Examples of thiocarbamylsulfenamide accelerators are shown in U.S. Pat. 2,381,393, Aug. 7, 1945. Smith assigned to Firestone; 2,388,236, Nov. 6, 1945, Cooper assigned to Monsanto; 2,424,921, July 29, 1947; Smith assigned to Firestone; and British Pat. 880,912, Oct. 25, 1961, Dodson assigned to Imperial Chemical Industries Limited. The invention is applicable to accelerator mixtures. The invention is applicable to stocks containing amine antidegradants. Rubber mixes containing antidegradants, for example, N - 1,3 - dimethylbutyl - N'-phenyl-p-phenylenediamine, N,N'-bis(1,4-dimethylpentyl)-p-phenylenediamine, and other phenylenediamines, ketone, ether, and hydroxy antidegradants, and mixtures thereof, are substantially improved using the process of my invention. Mixtures of antidegradants, for example, a mixture of N-1,3-dimethylbutyl-N'-phenyl-p-phenylenediamine and N,N'-bis(1,4-dimethylpentyl)-p-phenylenediamine, furnish a much improved final product when used with the inhibitors of this invention.

The inhibitors of this invention can be used in natural and synthetic rubbers and mixtures thereof. Synthetic rubbers that can be improved by the process of this invention include cis-4-polybutadiene, butyl rubber, ethylene-propylene terpolymers, polymers of 1,3-butadiene, for example 1,3-butadiene itself and of isoprene, copolymers of 1,3-butadiene with ether monomers, for example, styrene, acrylonitrile, or isobutylene, and methyl methacrylate.

The invention relates to diene rubbers and the terms, rubber and diene rubber, are synonymous for purpose of this invention.

The new compounds of this invention are prepared in the following manner:

N-(phenyldithio)phthalimide is synthesized according to the following equations:

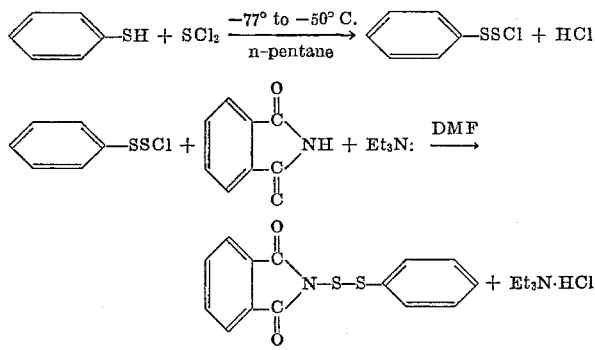

To prepare N-(phenyldithio)phthalimide, 51.5 grams (0.5 mole) of sulfur dichloride is dissolved in 500 ml. of n-pentane in a 1-liter three-necked flask equipped with a mechanical stirrer, a condenser, and a dropping funnel. Then a solution of 55 grams (0.5 mole) of thiophenol in 50 ml. of n-pentane is added dropwise to the flask contents at $-77°$ to $-50°$ C. over a period of 90 minutes. The flask contents are then added to a solution of 73.5 grams (0.5 mole) of phthalimide, and 65.0 grams (0.5 mole) of triethylamine in 300 ml. of dimethylformamide; and the reaction mixture is stirred for two hours. Two liters of cold water are added to the reaction mixture, the mixture is stirred, and the resulting solid is filtered and dried. An 89% yield is obtained weighing 127.0 grams. A sample of the product is recrystallized from a mixture of 50 parts by volume of methanol and 50 parts ethyl acetate to give a white solid, melting point 143°–145° C. Analysis of the product shows 4.48% nitrogen and 22.05% sulfur. Calculated percentages for $C_{14}H_9NO_2S_2$ are 4.87% nitrogen and 22.31% sulfur. The infrared spectrum is consistent with the structure of N-(phenyldithio)phthalimide.

To prepare N-(t-octyldithio)phthalimide, 58.0 grams (0.2 mole) of t-dioctyldisulfide is dissolved in 600 ml. of isopentane in a 1-liter three-necked flask equipped with a mechanical stirrer, a condenser, and a gas inlet tube. Then chlorine gas is passed into the solution at $-45°$ to $-48°$ C. over a period of 25 minutes. The amount of chlorine used is 14.5 grams (0.2 mole). The flask contents are then added to a solution of 29.4 grams (0.2 mole) of phthalimide and 27.0 grams (0.27 mole) of triethylamine in 195 ml. of dimethylformamide over a period of 15 minutes at $-20°$ C. The reaction mixture is stirred until the reaction temperature reaches room temperature. The reaction mixture is transferred to a three-liter beaker and 2.5 liters of ice water are added. The mixture is stirred, and the resulting soft-solid product is filtered. A quantitative yield is obtained. A sample of the product is recrystallized from n-heptane, and a white solid with a melting point of 75° C. is obtained. Analysis of the product shows 4.4% nitrogen and 19.82% sulfur. Calculated percentages for $C_{16}H_{21}NO_2S_2$ are 4.3% nitrogen and 19.82% sulfur. The infrared spectrum is consistent with the structure of N-(t-octyldithio)phthalimide.

To prepare N-(cyclohexyldithio)phthalimide, 21 grams (0.2 mole) of sulfur dichloride is dissolved in 100 ml. of methylene chloride in a 1-liter three-necked flask equipped with a mechanical stirrer, a condenser and a dropping funnel. To this solution of 29.4 grams (0.2 mole) of phthalimide and 20.0 grams (.02 mole) of triethylamine is added dropwise at $-10°$ to $+3°$ C. over a period of one hour. A solution of 23.2 grams (0.2 mole) of cyclohexylmercaptan and 25.0 grams (0.25 mole) of triethylamine in 50 ml. of methylene chloride is added to the reaction mixture over a 30 minute period at 0° to 5° C. The reaction mixture is stirred for one hour, then 200 ml. of water are added to it, and the organic layer is separated. The organic layer is evaporated to give a thick pasty brown product. Above 150 ml. of n-heptane are added to the product and it is warmed, then cooled, by a Dry-Ice acetone bath and filtered. A 73% yield, 42.4 grams, of a brown product is obtained. Recrystallization of a sample of the product from n-heptane gives a white solid with a melting point of 74° to 77° C. Analysis of the product shows 4.37% nitrogen and 22.3% sulfur. Calculated percentages for $C_{14}H_{15}NO_2S_2$ are 4.7% nitrogen and 21.8% sulfur. The infrared spectrum is consistent with the structure of N-(cyclohexyldithio)phthalimide.

To prepare N-(n-propyldithio)phthalimide, 21.0 grams of sulfur dichloride are dissolved in 100 ml. of n-pentane in a 250 ml. three-necked flask equipped with a mechanical stirrer, a condenser, and a gas inlet tube. Then 15.2 grams (0.2 mole) of n-propyl mercaptan in 75 ml. of n-pentane are added over a period of 35 minutes at $-68°$ to $-72°$ C. The solution is transferred to a 500 ml. round-bottomed flask, and the hydrogen chloride is removed under a vacuum. The vacuumed solution is added dropwise to a solution of 29.4 grams (0.2 mole) of phthalimide and 30 grams (0.3 mole) of triethylamine in 150 ml. of dimethylformamide at 10° to 15° C. over a 59 minute period. The reaction mixture is stirred for 2 hours, then two liters of ice water are added and stirred, and the oily layer is separated. The solution is extracted twice with ether, and the ether solution is added to the organic phase separated previously. The organic phase is evaporated and dried to give 42.0 grams, a 95% yield, of a red liquid. The 42.0 grams of red liquid are dissolved in n-heptane and cooled in a Dry-Ice acetone bath to yield a solid product. Recrystallization of a sample of the product gives a white solid with a melting point of 35° to 38° C. Analysis of the product shows 5.30% nitrogen and 25.35% sulfur. Calculated percentages for $C_{11}H_{11}NO_2S_2$ are 5.5% nitrogen and 25.31% sufur. The infrared spectrum is consistent with the structure of N-(n-propyldithio)phthalimide.

To prepare N-(isobutyldithio)succinimide, 45.0 grams (0.5 mole) of isobutyl mercaptan is dissolved in 50 ml. of n-pentane and then added to a solution of 51.5 grams (0.5 mole) of sulfur dichloride in 250 ml. of n-pentane at $-75°$ to $-65°$ C. over a 30 minute period in a 500 ml. three-necked bask equipped with a mechanical stirrer, a condenser, and a dropping funnel. The solution is stirred during this period. The resulting solution is then added dropwise to a 1-liter three-necked flask equipped with a mechanical stirrer, a condenser, and a dropping funnel and containing 37.5 grams (0.5 mole) of succinimide and 70.0 grams (0.70 mole) of triethylamine in 250 ml. of dimethylformamide. The reaction mixture is stirred for 30 minutes and then transferred to a beaker. One liter of cold water is added, the organic layer is separated, dried over sodium sulfate, and evaporated to give 70.0 grams, a 63% yield, of a brown liquid. The infrared spectrum is consistent with the structure of (N-isobutyldithio)succinimide. The remaining compounds of this invention are prepared in a similar manner to the preparations described above with comparable results.

The following tables illustrate the utility of the invention. For the rubber stocks tested and described, infra, as illustrative of the invention, Mooney scorch times at 121° C. and 135° C. are determined by means of a Mooney plastometer. The time in minutes ($t_5$) required for the Mooney reading to rise five points above the minimum viscosity is recorded. Longer times are indicative of the activity of the inhibitor. Longer times on the Mooney Scorch Test are desirable because this indicates greater processing safety. Percentage increases in scorch delay are calculated by dividing the Mooney scorch time of the stock containing the premature vulcanization inhibitor by the Mooney scorch time of the control stock, multiplying by 100, and subtracting 100.. These increasese show the percentage improvement in scorch delay over the control stock which contains no inhibitor. Additionally, cure ratings are calculated from the time required to cure the stocks at 144° C., and in some cases 153° C. Curing characteristics are determined by means of the Monsanto Oscillating Disk Rheometer described by Decker, Wise, and Guerry in Rubber World, December 1962, page 68. From the Rheometer data, R.M.T. is the maximum torque in Rheometer units, $t_2$ is the time in minutes for a rise of two Rheometer units above the minimum reading, and $t_{90}$ is the time required to obtain a torque 90% of the maximum. The specific rate constant "$k$" is measured in reciprocal minutes and is described by Coran in 37 Rubber Chemistry and Technology, 689, (1964). Higher values of $k_2$ indicate higher rates of cross-linking in rubber.

Santocure MOR and Santoflex 13 in the tables, infra, are trademarks. Santocure MOR is a trademark for the accelerator 2-(morpholinothio)benzothiazole. Santoflex 13 is a trademark for the antidegradant N-1,3-dimethyl-butyl-N'-phenyl-p-phenylenediamine.

The data in Table I illustrate the results obtained using N-(t-octyldithio)phthalimide as a premature vulcanization inhibitor in a natural rubber stock containing other additives routinely used in rubber. The second stock which contains the N-(t-octyldithio)phthalimide of the invention shows a 107% increase in scorch time over the first stock which contains no premature vulcanization inhibitor. The stocks in Table I, II, and III contain the following:

| | Parts by wt. |
|---|---|
| Natural rubber | 100 |
| Carbon black | 45 |
| Zinc oxide | 3 |
| Stearic acid | 2 |
| Hydrocarbon softener | 5 |
| Sufur | 2.5 |
| Santocure MOR | 0.5 |
| Santoflex 13 | 2 |

TABLE I

| Premature vulcanization inhibitor | Mooney scorch at 121° C. $t_5$ | Percent increase in scorch delay | Rheometer at 144° C. | | | |
|---|---|---|---|---|---|---|
| | | | $t_2$ | $t_{90}$ | R.M.T. | $k_2$ |
| | 25.7 | | 8.0 | 22.5 | 59.0 | 0.157 |
| N-(t-octyldithio)-phthalimide (1 part by weight) | 53.2 | 107 | 15.0 | 30.0 | 57.8 | 0.162 |

The data in Table II illustrate the results using inhibitors of this invention in natural rubber stocks containing other additives routinely used in rubber. The $k_2$ values illustrate a faster cure rate for rubber stocks including the premature vulcanization inhibitors, N-(isobutyldithio)succinimide, N - (isobutyldithio)piperidine, N - (phenyldithio)morpholine, and N-(isobutyldithio) morpholine, of this invention compared to the control.

The data in Table III illustrate the results obtained using N-(cyclohexyldithio)phthalimide and N-(n-propyldithio)phthalimide as premature vulcanization inhibitors in stocks of natural rubber containing other additives routinely used in rubber. The rubber stocks using the premature vulcanization inhibitors of this invention show an increase in maximum torque with an increase in inhibitor concentration. The stocks include the following concentrations of premature vulcanization inhibitors:

| Stock | Inhibitor | Parts by weight |
|---|---|---|
| 1 | No inhibitor | |
| 2 | N-(cyclohexyldithio)phthalimide | 0.29 |
| 3 | do | 0.59 |
| 4 | do | 1.17 |
| 5 | N-(n-propyldithio)phthalimide | 0.25 |
| 6 | do | 0.51 |
| 7 | do | 1.01 |

TABLE III

| Stock | 1 | 2 | 3 | 4 | 5 | 6 | 7 |
|---|---|---|---|---|---|---|---|
| Mooney scorch at 121° C.: | | | | | | | |
| $t_5$ | 24.2 | 35.2 | 41.7 | 52.1 | 33.9 | 40.0 | 49.7 |
| $t_{35}-t_5$ | 6.1 | 6.4 | 7.0 | 9.1 | 6.5 | 7.4 | 7.7 |
| Percent increase in scorch delay | | 45 | 72 | 115 | 40 | 65 | 105 |
| Rheometer at 144° C.: | | | | | | | |
| $t_2$ | 7.0 | 10.3 | 12.5 | 15.0 | 11.0 | 12.0 | 14.5 |
| $t_{90}$ | 20.0 | 23.0 | 25.3 | 28.0 | 22.6 | 24.0 | 28.9 |
| R.M.T. | 56.3 | 57.7 | 58.1 | 58.3 | 58.3 | 58.7 | 59.0 |
| $k_2$ | 0.174 | 0.174 | 0.173 | 0.168 | 0.173 | 0.164 | 0.168 |

Table IV illustrates the results obtained using N-(t-hexyldithio)phthalimide as a premature vulcanization inhibitor in an oil-extended styrene-butadiene rubber. The stocks in Table IV contain the following:

| | Parts by weight |
|---|---|
| Oil-extended styrene-butadiene rubber containing 37.5% highly aromatic oil | 137.5 |
| Carbon black | 65 |
| Zinc oxide | 3 |
| Stearic acid | 1 |
| Hydrocarbon softener | 1.5 |
| Sulfur | 2 |
| Santocure MOR | 1.2 |
| Santoflex 13 | 2 |

TABLE IV

| Premature vulcanization inhibitor | | N-(t-hexyldithio)phthalimide (1 part by weight) |
|---|---|---|
| Mooney scorch at 135° C., $t_5$ | 35.0 | 40.1 |
| Percent increase in scorch delay | | 15 |
| Rheometer at 153° C.: | | |
| $t_2$ | 14.0 | 14.0 |
| $t_{90}$ | 26.0 | 28.3 |
| R.M.T. | 44.5 | 43.5 |
| $k_2$ | 0.165 | 0.178 |

Comparable results to those in the tables, supra, are obtained using other compounds of this invention as premature vulcanization inhibitors.

It is intended to cover all changes and modifications of the examples of the invention herein chosen for purposes of disclosure which do not constitute departures from the spirit and scope of the invention.

TABLE II

| Premature vulcanization inhibitor | Mooney scorch at 121° C., $t_5$ | Cure rate, $t_{35}-t_5$ | Percent increase in scorch delay | Rheometer at 144° C. | | | |
|---|---|---|---|---|---|---|---|
| | | | | $t_2$ | $t_{90}$ | R.M.T. | $k_2$ |
| N-(phenyldithio)-phthalimide (1 part by weight) | 38.2 | 4.5 | | 11.8 | 27.5 | 51.5 | 0.159 |
| | 50.1 | 6.3 | 31 | 14.0 | 31.3 | 54.8 | 0.159 |
| N-(isobutyldithio)-succinimide (0.5 part by weight) | 49.4 | 5.5 | 29 | 14.5 | 30.5 | 53.0 | 0.162 |
| N-(isobutyldithio)-piperidine (1 part by weight) | 40.3 | 3.6 | 10 | 12.5 | 25.5 | 65.6 | 0.198 |
| N-(phenyldithio)-morpholine (1 part by weight) | 41.6 | 5.1 | 11 | 12.8 | 27.0 | 58.0 | 0.19 |
| N-(isobutyldithio)-morpholine (1 part by weight) | 47.0 | 5.3 | 12 | 13.8 | 26.8 | 63.0 | 0.21 |

I claim:
1. A compound of the formula

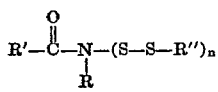

wherein R and R' with the carbonyl and N atom are N-maleimidyl, N-succinimidyl, N-adipimidyl, N-glutarimidyl, 4-cyclohexene-1,2-dicarboximid-N-yl, 1,4,5,6,7,7-hexachlorobicyclo[2.2.1]hept - 5 - ene-2,3-dicarboximid-N-yl, bicyclo[2.2.1]hept-5-ene - 2,3 - dicarboximid-N-yl, 7 - oxabicyclo[2.2.1]heptane - 2,3 - dicarboximid-N-yl, 7-oxabiscyclo[2.2.1]hept-5-ene - 2,3 - dicarboximid-N-yl, 1,2,4,5 - benzenetetracarboxylic - 1,2:4,5 - diimid-N,N'-yl, N-phthalimidyl, N-hexahydrophthalimidyl, N-naphthalimidyl, N-(3,4,5,6-tetrahalophthalimidyl), and R'' is alkyl of 1–12 carbon atoms, aryl of 6–10 carbon atoms or cycloalkyl of 5–8 carbon atoms and $n$ is the valence of the radical to which —S—S—R'' is attached.

2. A compound according to claim 1 wherein R and R' with the carbonyl and N atom is N-succinimidyl.

3. A compound according to claim 1 wherein R and R' with the carbonyl and N atom is N-phthalimidyl.

4. A compound according to claim 1 wherein R and R' with the carbonyl and N atom are N-succinimidyl and R'' is phenyl, the compound having the formula

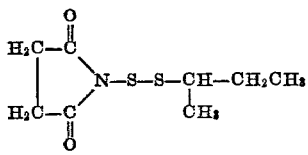

and named N-(isobutyldithio)succinimide.

5. A compound according to claim 1 wherein R and R' with the carbonyl and N atom are N-phthalimidyl and R'' is cyclohexyl, the compound having the formula

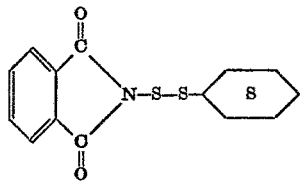

and named N-(cyclohexyldithio)phthalimide.

6. A compound according to claim 1 wherein R and R' with the carbonyl and N atom are N-phthalimidyl and R'' is t-octyl, the compound having the formula

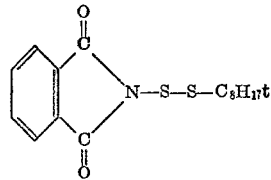

and named N-(t-octyldithio)phthalimide.

7. A compound according to claim 1 wherein R and R' with the carbonyl and N atom are N-phthalimidyl and R'' is phenyl, the compound having the formula

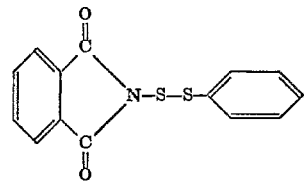

and named N-(phenyldithio)phthalimide.

8. A compound according to claim 1 wherein R and R' with the carbonyl and N atom are

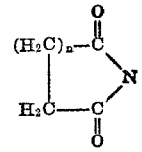

where $n$ is 1, 2 or 3.

References Cited

Cremlyn: Chem. Abs., vol. 56, 5882–83 (1962).
Cremlyn: Chem. Abs., vol. 57, 9704 (1963).

ALEX MAZEL, Primary Examiner
J. A. NARCAVAGE, Assistant Examiner

U.S. Cl. X.R.

260—239.3 R, 281, 326.5 FM

UNITED STATES PATENT OFFICE
CERTIFICATE OF CORRECTION

Patent No. 3,709,907    Dated January 9, 1973

Inventor(s) Mohammad Behforouz

It is certified that error appears in the above-identified patent and that said Letters Patent are hereby corrected as shown below:

Column 1, line 71 "sulfonamide" should read --sulfenamide--

Column 2, lines 14-15 "salicyclic" should read --salicylic--;
    Line 15 "terpent-" should read --terpene- --;
    Line 21 "sulfonamides" should read --sulfenamides--;
    Line 51 insert --is-- after "nucleus";
    Line 70 "radical" should read --radicals--

Column 3, line 4 "fluori" should read --fluoro--; line 54
    "imidazolindinon" should read --imidazolidinon--;
    Line 55 "imidazolindon" should read --imidazolidinon--;
    Line 67 "dimid" should read --diimid--

Column 4, line 51 insert --(-- after "N-"; line 54 delete ")"
    after "carbamoyl"; insert --(-- after "N-" in line 55.

Column 5, line 8 "branced" should read --branched--;
    line 14 "N(-(" should read --N-(--; line 51
    "tolyllithio" should read --tolyldithio--

Column 6, line 29 delete line 29 and in place thereof insert
    --1,3-bis(n-dodecyldithio)-2-imidazolinone--;
    Lines 33-35 remove line 33 and in place thereof insert
    --1-phenylthio-3-phenyldithio-2-imidazolinone--;
    Line 75 delete "(" after "N-"

Column 7, line 16 "malemide" should read --maleimide--;
    Line 61 after ",7" insert another --,7--; line 70
    "dodecylthio)" should read --dodecyldithio)--

UNITED STATES PATENT OFFICE
CERTIFICATE OF CORRECTION

Patent No. 3,709,907          Dated January 9, 1973

Inventor(s) Mohammad Behforouz

It is certified that error appears in the above-identified patent and that said Letters Patent are hereby corrected as shown below:

Column 8, line 33 "bezimidazolinone" should read
--benzimidazolinone--

Column 9, line 11 "imidazolinone" should read --imidazolidinone--;
Delete line 44.

Column 10, line 12 "morpohline" should read --morpholine--;
Line 13 "pentadecydithio" should read --pentadecyl-dithio--; Line 31 "elements" should read --elemental--;
Line 50 "2,381,393" should read --2,381,392--; same
line 50 change "." after "1945" to --,--; line 52
change ";" after "1947" to --,--; Line 53 "Dodson"
should read --Dadson--; Line 74 "ether" should read
--other--.

Column 11, lines 16 and 17 in the formula "$\overset{\|}{C}\atop C$" should read --$\overset{\|}{C}\atop O$--

Column 12, line 30 "59 min." should read --50 min.--;
Line 43 "sufur" should read --sulfur--; line 51 "bask"
should read --flask--.

Column 13, line 6 "increasese" should read --increases--;
Line 42 "Sufur" should read --Sulfur--; Table I a dash
should be inserted in the first line in first column
to show no inhibitor; Table II a dash should be
inserted in the first line in first column to show
no inhibitor; Table II the column under "$k_2$", "0.159"
in both instances should read --0.155--.

UNITED STATES PATENT OFFICE
CERTIFICATE OF CORRECTION

Patent No. 3,709,907  Dated January 9, 1973

Inventor(s) Mohammad Behforouz

It is certified that error appears in the above-identified patent and that said Letters Patent are hereby corrected as shown below:

Column 14, Table IV a dash should be inserted over the first column to show no inhibitor.

Column 15, line 13 "oxabiscyclo" should read --oxabicyclo--;
Line 16 (Claim 1) insert --CCl$_3$,-- after "R" is" and insert --hydrocarbon-- after "alkyl"

Signed and sealed this 18th day of December 1973.

(SEAL)
Attest:

EDWARD M. FLETCHER, JR.　　　　　RENE D. TEGTMEYER
Attesting Officer　　　　　　　　　Acting Commissioner of Patents